United States Patent [19]

Taylor

[11] Patent Number: 5,727,663
[45] Date of Patent: Mar. 17, 1998

[54] METHOD FOR STRENGTHENING STRUCTURES AGAINST DAMAGE FROM SEISMIC FORCES

[75] Inventor: Douglas P. Taylor, Tonawanda, N.Y.

[73] Assignee: Tayco Developments, Inc., North Tonawanda, N.Y.

[21] Appl. No.: 799,648

[22] Filed: Feb. 10, 1997

Related U.S. Application Data

[60] Continuation of Ser. No. 429,921, Apr. 27, 1995, abandoned, which is a division of Ser. No. 59,246, May 7, 1993, Pat. No. 5,462,141.

[51] Int. Cl.$^6$ .................... F16F 7/10; E04B 1/98
[52] U.S. Cl. .................. 188/378; 188/280; 188/299; 52/167.1; 52/167.3
[58] Field of Search .................. 52/167.1, 167.2, 52/167.3, 167.4, 167.5, 167.6, 167.7, 167.8; 188/266, 268, 269, 275, 279, 280, 282, 297, 299, 311, 313, 318, 322.11, 322.14, 322.19, 322.22, 322.5; 267/64.15, 113, 118, 128, 140.11

[56] References Cited

U.S. PATENT DOCUMENTS

| | | | |
|---|---|---|---|
| 2,909,368 | 10/1959 | Taylor | 267/64 |
| 3,115,003 | 12/1963 | Taylor | 60/23 |
| 3,164,381 | 1/1965 | Tuczek | 188/269 X |
| 3,256,005 | 6/1966 | Taylor | 267/64 |
| 3,303,856 | 2/1967 | Taylor | 138/31 |
| 3,418,768 | 12/1968 | Cardan | 52/167 CB |
| 3,618,928 | 11/1971 | Taylor | 267/65 |
| 3,722,640 | 3/1973 | Taylor | 188/316 |
| 3,856,242 | 12/1974 | Cook | 52/167.1 X |
| 3,947,004 | 3/1976 | Taylor | 267/65 R |
| 4,040,590 | 8/1977 | Baratoff | 188/268 X |
| 4,150,819 | 4/1979 | Taylor | 267/136 |
| 4,307,874 | 12/1981 | Reuschenbach et al. | 267/124 X |
| 4,506,869 | 3/1985 | Masclet et al. | 188/279 X |
| 4,513,833 | 4/1985 | Sheldon | 188/322.14 X |
| 4,532,856 | 8/1985 | Taylor | 92/168 |
| 4,548,041 | 10/1985 | Taylor | 60/632 |
| 4,591,033 | 5/1986 | Taylor | 188/317 |
| 4,638,895 | 1/1987 | Taylor | 188/280 |
| 4,702,123 | 10/1987 | Hirao et al. | 188/299 X |
| 4,768,627 | 9/1988 | Taylor | 188/280 |
| 4,815,574 | 3/1989 | Taylor | 188/280 |
| 4,817,766 | 4/1989 | Nilsson | 188/280 X |
| 4,867,286 | 9/1989 | Taylor | 188/282 |
| 5,024,302 | 6/1991 | Karnopp | 188/299 |
| 5,158,270 | 10/1992 | Lin | 188/313 X |
| 5,310,157 | 5/1994 | Platus | 248/619 |
| 5,398,785 | 3/1995 | Leitmann et al. | 188/267 |

FOREIGN PATENT DOCUMENTS

| | | | |
|---|---|---|---|
| 130940 | 6/1988 | Japan | 52/167 CB |
| 301115 | 12/1988 | Japan | 188/269 |
| 209570 | 8/1990 | Japan | 52/167 CB |
| 3235856 | 10/1991 | Japan | 52/167 CB |

*Primary Examiner*—Chris Schwartz
*Attorney, Agent, or Firm*—Joseph P. Gastel

[57] ABSTRACT

A seismic shock isolator and method of strengthening structures against seismic shock is disclosed. The shock isolator includes a cylinder having a damping chamber and an accumulator chamber and a piston movable into the damping chamber. The damping chamber can contain compressible liquid or incompressible liquid. The piston has a damping head and a first control orifice, and the accumulator chamber is separated from the damping chamber by a wall having a second control orifice having a higher exponent than the first control orifice. Movement of the piston into the damping chamber creates a combination of damping and stiffening having a spring component. When the isolator has compressible liquid therein, the spring and stiffening is produced by a compression of the liquid. When the isolator contains an incompressible liquid, the stiffening and spring component are obtained by a yielding of a column which movably supports the wall which divides the damping chamber from the accumulator chamber. The method protects the structure against damage due to seismic forces having a band of frequencies, and it includes the placement of a passive restraining seismic isolator of the above type in the structure and applying a combination of hydraulic damping and frequency dependent stiffening with a spring component to the structure in response to the structure being subjected to seismic forces.

9 Claims, 8 Drawing Sheets

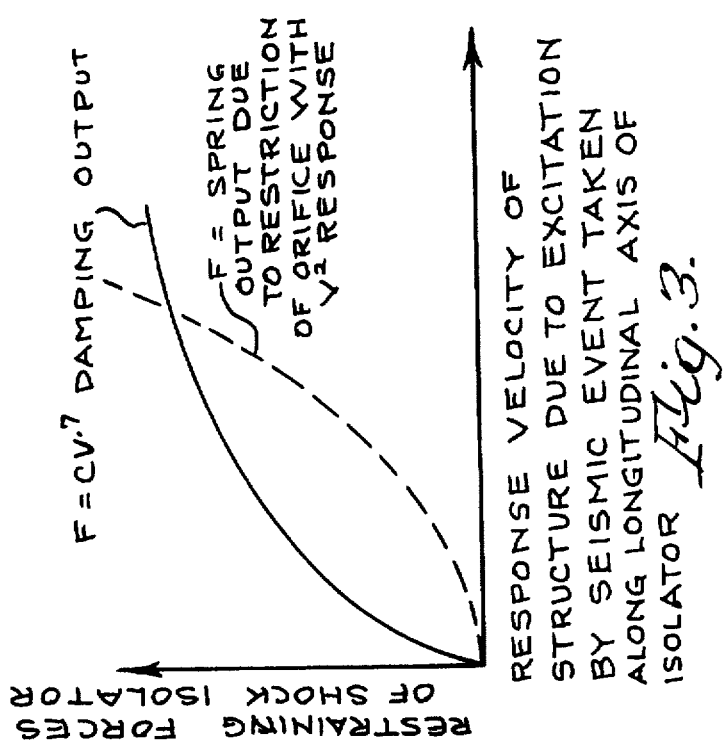
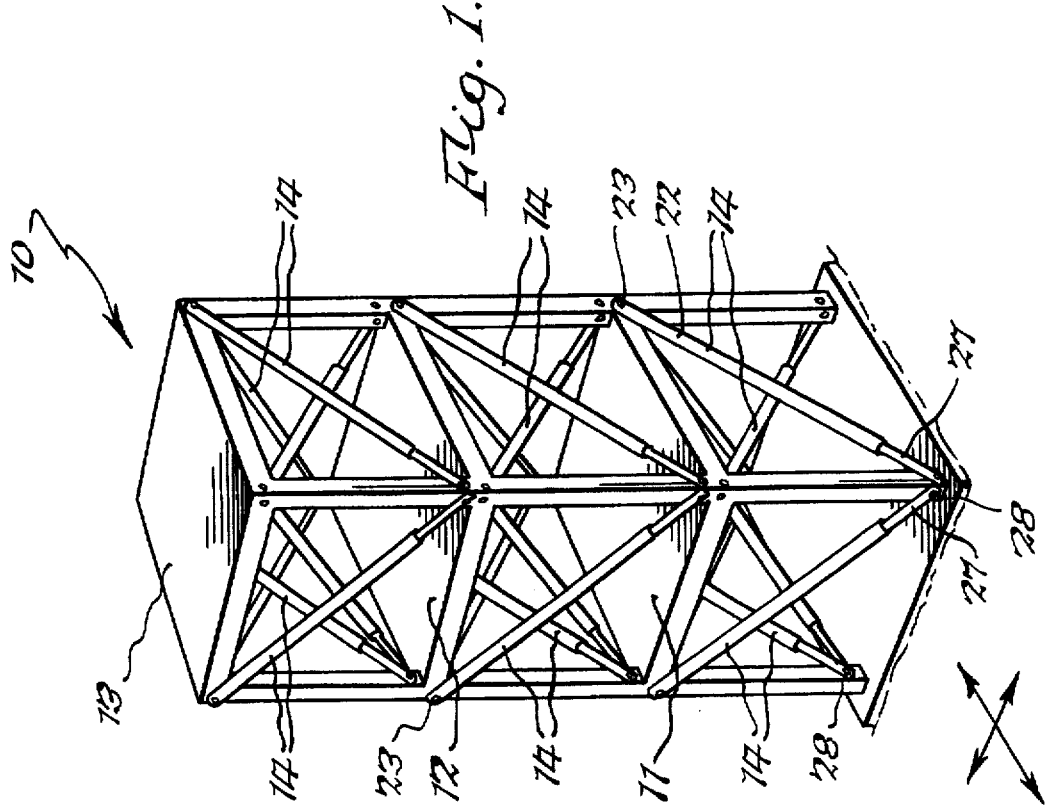

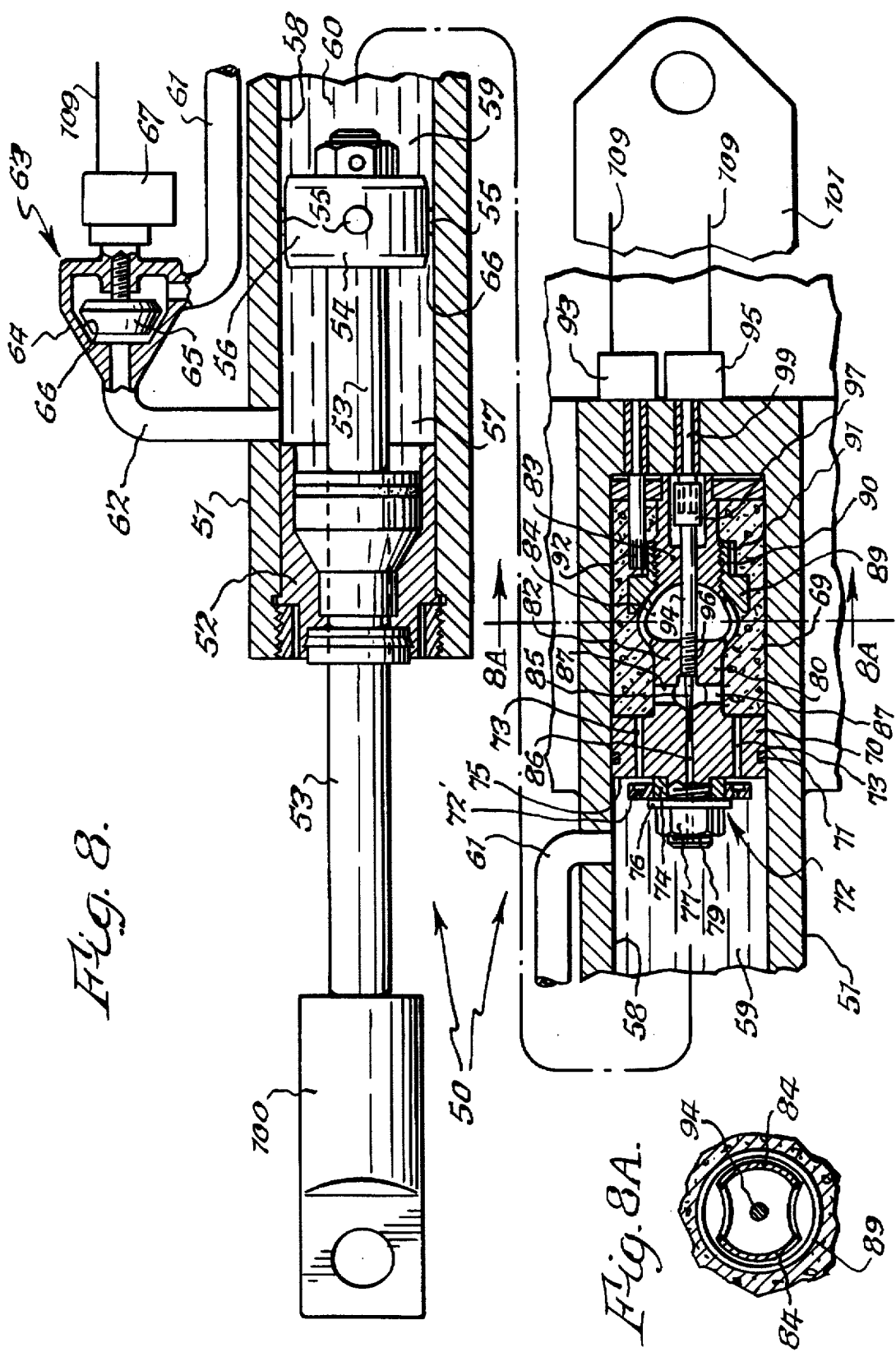

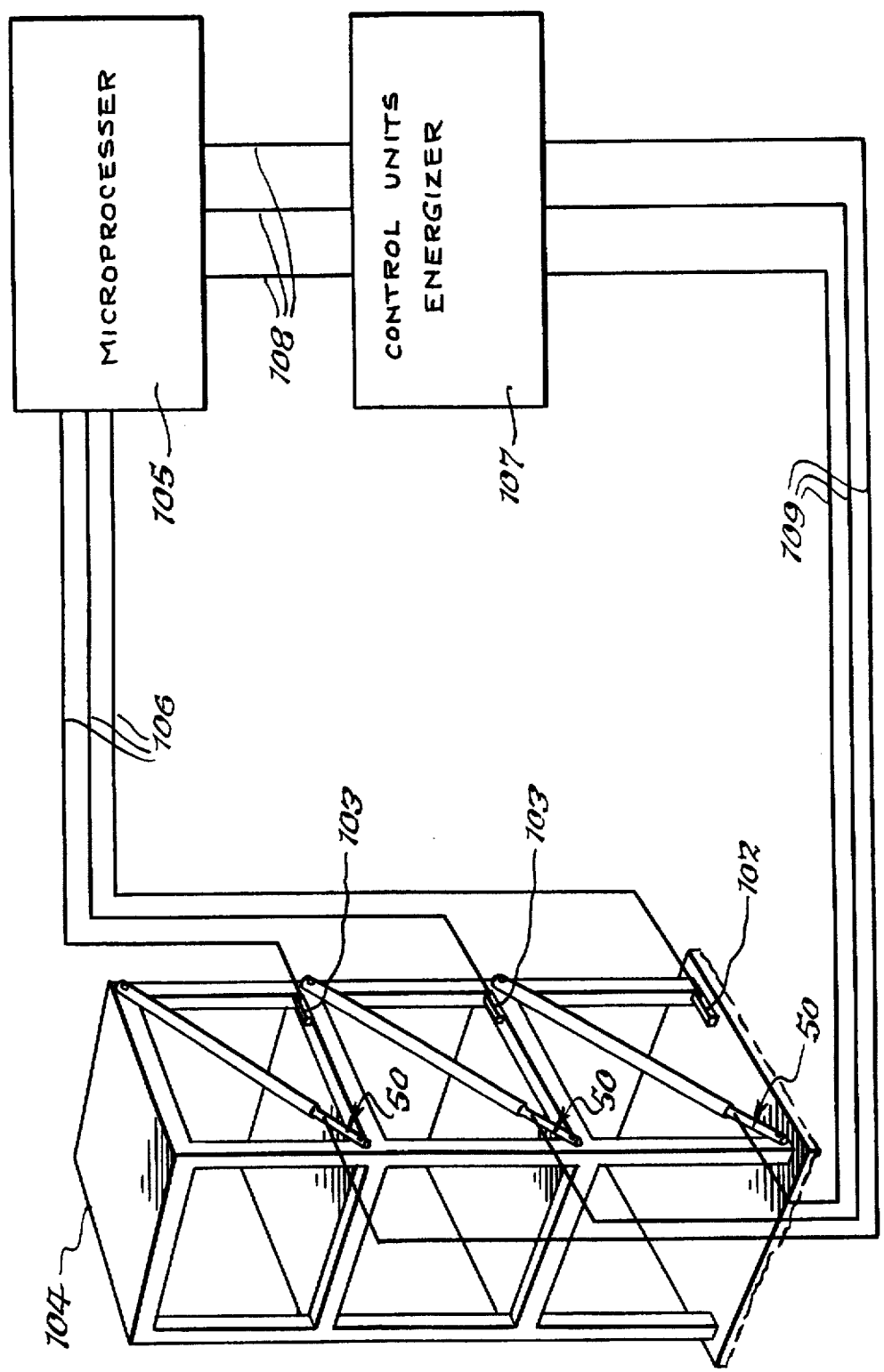

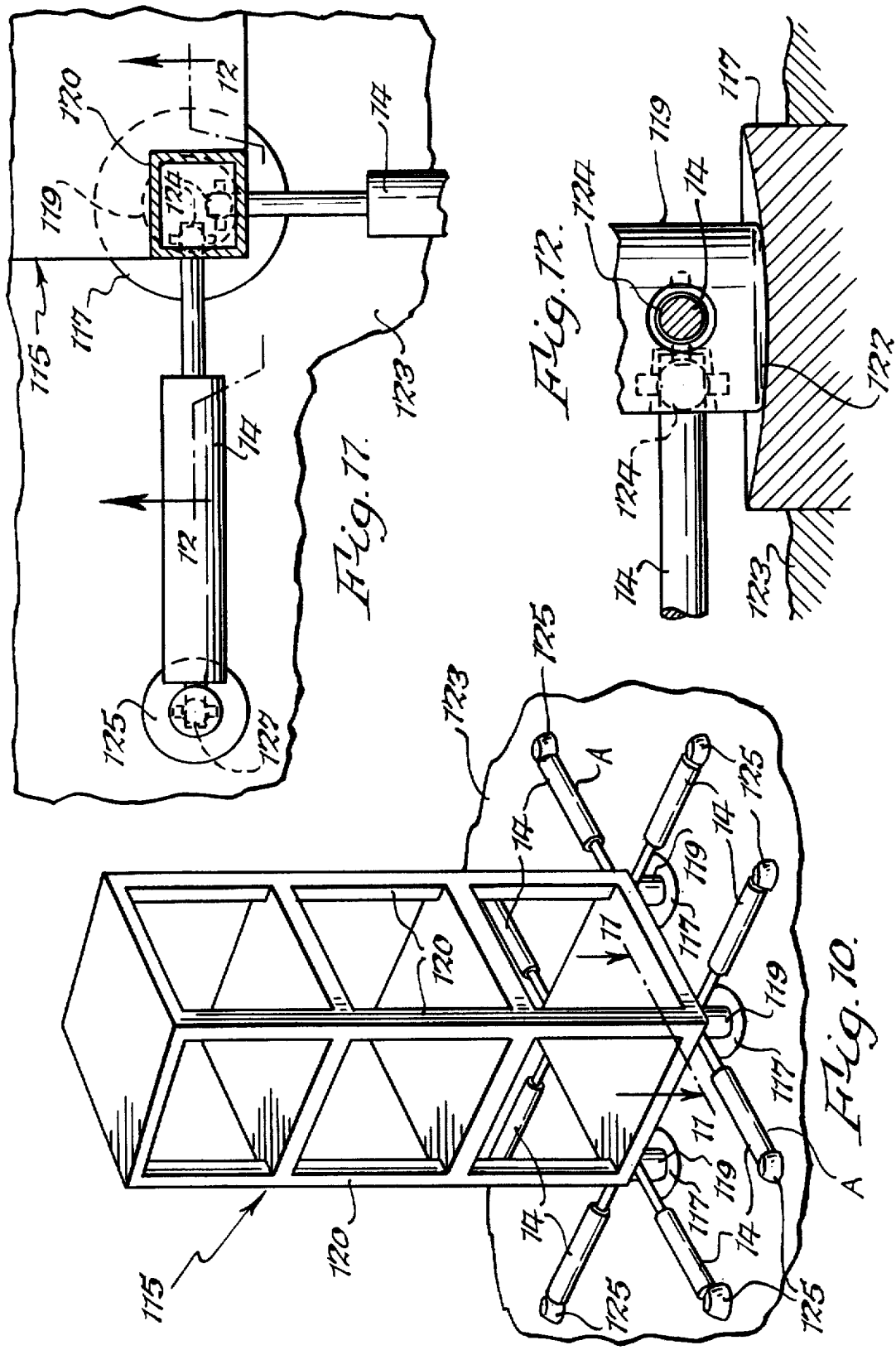

METHOD FOR STRENGTHENING STRUCTURES AGAINST DAMAGE FROM SEISMIC FORCES

This application is a Continuation of application Ser. No. 08/429,921, now abandoned, filed Apr. 27, 1995, which is a division of application Ser. No. 08/059,256, filed May 7, 1993, now U.S. Pat. No. 5,462,141.

BACKGROUND OF THE INVENTION

The present invention relates to improved seismic shock isolation devices and a method for strengthening structures against damage from seismic forces.

By way of background, structures such as buildings and bridges are constructed so that their resonant frequencies do not coincide with the expectant peak frequencies of earthquakes in the localities in which they are built. In the past there have been both active and passive arrangements for reinforcing buildings against the expected seismic peak frequencies. Insofar as known, the passive arrangements consisted of separate spring, elastomer or friction elements associated with a structure for suppressing seismic shocks. These typically utilized springs or spring-loaded counterweights which were combined with separate damping elements such as sliding friction connections.

SUMMARY OF THE INVENTION

It is one object of the present invention to provide an improved passive seismic shock isolating device which absorbs seismic forces by both a combination of a damping and spring-like stiffening action.

Another object of the present invention is to provide an improved hydraulic seismic shock isolating device which can be incorporated into a structure during the construction thereof or may be retrofitted into an existing structure.

A further object of the present invention is to provide an improved method of protecting a structure against damage from seismic forces. Other objects and attendant advantages of the present invention will readily be perceived hereafter.

The present invention relates to a seismic isolator for providing hydraulic damping and frequency-dependent stiffening to a structure subjected to variable frequency seismic forces comprising a cylinder, a damping chamber in said cylinder, liquid in said damping chamber, an accumulator chamber for receiving liquid from said damping chamber, a piston having a first piston portion in said damping chamber and a second piston portion located outside of said damping chamber, a damping head on said piston in said first chamber dividing said damping chamber into first and second subchambers, first liquid passing means operatively associated with said damping head for permitting liquid flow between said first and second subchambers, dividing means between said damping chamber and said accumulator chamber for primarily causing said liquid to be retained in said damping chamber, said first subchamber being located in the portion of said cylinder in which said piston is located, said second subchamber being located between said damping head and said dividing means, and second liquid passing means operatively associated with said dividing means for permitting flow of liquid between said second subchamber and said accumulator, said first and second liquid passing means being so proportioned that said seismic isolator produces primarily damping forces and some stiffening forces when seismic forces have velocities associated with their frequencies which are transmitted to said piston and which are below a predetermined value and produces increasing stiffening forces with a spring component as said velocities associated with the frequency of said seismic forces which are transmitted to said piston increase toward and above said predetermined value.

The present invention also relates to a method of protecting a structure against damage due to seismic forces having a band of frequencies comprising the steps of learning the resonant frequencies of various portions of said structure, and providing a combination of damping restraining forces and stiffening restraining forces having a spring component to said various portions of said structure wherein said damping restraining forces are dominant to said stiffening restraining forces having said spring component when said frequencies of said seismic disturbances are below said resonant frequencies of said structure to thereby permit flexing of said portions of said structure possibly accompanied by some stiffening thereof and wherein said stiffening restraining forces with said spring component increase as said frequencies of said seismic forces increase to thereby stiffen said structure against resonating with said seismic forces.

The various aspects of the present invention will be more fully understood when the following portions of the specification are read in conjunction with the accompanying drawings wherein:

BRIEF DESCRIPTION OF THE DRAWINGS

FIG. 1 is a representation of a structure, such as a building, having a plurality of improved seismic shock isolating devices of the present invention incorporated therein;

FIG. 3 is a graph showing the manner in which the device of FIG. 2 operates to provide a combination of damping and spring-like stiffening forces under various velocities applied thereto from the structure moving in response to seismic forces;

FIG. 8 is a view partially in cross section showing a seismic isolator having a flexible column in the accumulator and motors for actuating the shock isolator to provide hybrid control of the stiffness and dampening output of the seismic shock isolator in response to different conditions;

FIG. 8A is a cross sectional view taken substantially along line 8A—8A of FIG. 8;

FIG. 9 discloses a shock isolating system actuated by computer and incorporating seismic isolators of the type shown in FIG. 8;

FIG. 10 is a fragmentary perspective view of a building mounted on base isolation bearings and having associated therewith seismic isolation devices of the preceding figures;

FIG. 11 is a fragmentary cross sectional view taken substantially along line 11—11 of FIG. 10 and showing how the seismic isolation devices are associated with the corners of the building; and FIG. 12 is a fragmentary enlarged cross sectional view taken substantially along line 12—12 of FIG. 11.

DESCRIPTION OF THE PREFERRED EMBODIMENTS

Summarizing briefly in advance, the improved hydraulic device of the present invention provides seismic shock isolation to a structure by applying thereto a combination of primarily damping and some spring-like stiffening below resonant frequencies of the structure and a combination of damping and increased stiffening as the seismic frequencies approach or exceed the resonant frequencies of the structure. One embodiment of the device utilizes a noncompressible fluid and provides damping plus spring-like stiffening by utilizing the yieldability of structural components of the device, and another preferred embodiment utilizes compressible fluid and provides a combination of damping and velocity-driven elasticity type of stiffening because of the compressibility of the fluid. Both embodiments, when properly applied, result in almost a total suppression of the higher frequency modes of the seismic event because of the spring-like stiffening which is added to the damping.

In FIG. 1 a structure 10 is schematically shown which may be a three-story steel building having floors 11, 12 and 13 which are reinforced by shock isolators 14 of the present invention, each of which has its opposite ends effectively pivotally attached to appropriate portions of the structure. While a steel building 10 is depicted, it will be appreciated that the shock isolation system can be applied to any type of structure including reinforced concrete buildings, bridges, tunnels and industrial installations. Also, the shock isolation system can be installed during the process of building a structure or it can be retrofitted into existing structures.

The building of FIG. 1 is of the so-called fixed base type, where the lowest floor of the building is directly attached by its foundation members to the ground. This type of construction is often used in the construction of tall buildings, being more than seven stories high. FIG. 10 depicts a so-called base isolated building, which is mounted on top of a series of base isolation bearings, of the friction slider or rubber type. This type of construction is often used on buildings of less than seven stories high, particularly those of masonry or reinforced concrete construction. This type of construction is also common to bridges which must be protected against seismic damage. In this case dampers can be mounted mechanically in parallel with the base isolation bearings, and/or in the region between floors as depicted in FIG. 1.

Figure 2:
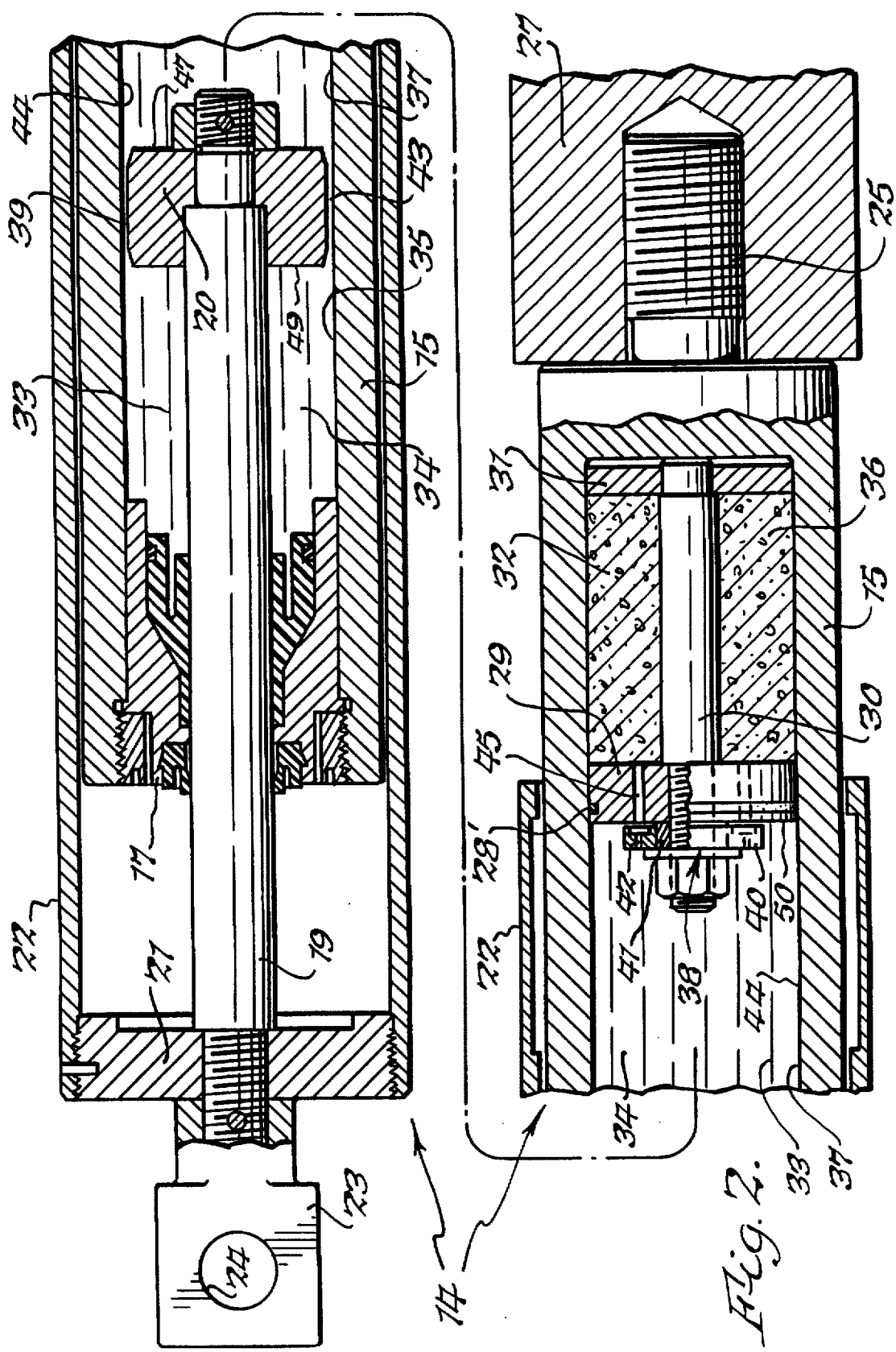
FIG. 2 is a fragmentary view, partially in cross section, of one embodiment of the improved shock isolating device of the present invention.

The improved shock isolating device 14 of the present invention shown in FIG. 2 includes a cylinder 15 having an end wall 17 with a suitable sealing arrangement therein for piston 19. The sealing arrangement can be of any suitable type, for example as shown in U.S. Pat. Nos. 3,256,005 and 4,532,856. The piston 19 includes a damping head 20 which is suitably mounted at one end of piston 19. The opposite end of piston 19 is secured to wall 21 of housing 22 which encircles cylinder 15. A suitable connector 23 has a cylindrical opening 24 therein for pivotally connecting piston 19 to a structure. Cylinder 15 has a threaded end 25 connected to member 27 which, in turn, is pivotally mounted to the structure 10 at 28.

A dividing wall 29, which can be movable to function as a piston, is located within cylinder 15. An O-ring 28' on dividing wall 29 provides a seal with the inner surface of the cylinder. Dividing wall 29 is mounted at one end of shaft or column 30, the other end of which is fixedly secured in fixed wall 31 within cylinder 15. The chamber 32 between walls 29 and 31 is an accumulator for any hydraulic fluid 33 in chamber 34 which is located between end wall 17 and wall 29. In this instance the accumulator chamber 32 contains foam 36, but the accumulator may be of any desired type which could be either installed into or piped into the cavity formed between walls 29 and 31. Chamber 34 is divided by damping head 20 into (1) subchamber 35 which is located between damping head 20 and end wall 17 and (2) subchamber 37 which is located between damping head 20 and accumulator dividing wall 29. At this point it is to be noted that wall 29 need not be movable and column 30 can be rigid when a compressible hydraulic fluid, such as silicone oil, is used. In this instance the spring-like action is obtained from the compressibility of the silicone oil. However, wall 29 does have to be movable and column 30 has to be yieldable within its elastic limit when a noncompressible hydraulic fluid, such as water soluble or petro-chemical oil, is used, and the spring-like action is obtained from the spring effect of yieldable column 30.

The damping head has an outer configuration 39 which may be of the fluidic type, such as shown in U.S. Pat. No. 3,722,640. This configuration is essentially a control orifice for passing fluid between subchambers 35 and 37 during movement of the damping head 20. Alternatively, a control orifice, such as shown in U.S. Pat. No. 4,064,977, can be placed in the damping head 20 itself. The control orifice can be of any suitable shape. The orifice attributable to the outer configuration of the damping head 20 should have a relatively low damping exponent of less than 2. Thus, as the piston 19 moves in chamber 34, there will be a flow of liquid 33 about damping head 20 between subchambers 35 and 37.

A control valve 38 is associated with dividing wall 29 and it comprises a disc 40 which is slidable on sleeve 41. Disc 40 contains one or more control orifices 42. Disc 40 moves to the position of FIG. 2B when piston 19 is entering cylinder 15, and it moves to the position of FIG. 2A when piston 19 is moving out of cylinder 15. The control orifice 42 has a relatively high flow exponent such that its exponent is greater than that of the damping head 39. Alternatively, a valve which opens or closes at higher pressures may be used in damping head 20 coupled with any type of orifice having a higher flow exponent in the disc 40 of control valve 38.

By way of explanation, a typical fluidic orifice would have a damping output equation of the form $F=CV^K$ where F equals the damping force, V equals the fluid velocity through the control orifice, C equals a damping constant based on the fluid which is being used with the orifice, and K equals an exponent in the range of 0.7 to 1.2. If the control valve 38 incorporates a simple control valve orifices 42 consisting of one or more apertures, its flow equation follows the form $F=CV^2$ wherein the exponent 2 is a constant associated with classical hydraulic flows and is higher than the exponent for the flow orifice exponent of between 0.7 and 1.2 of the damping head. The area of the control orifices 42 in the control valve 38 is much less than the area of the effective control orifice of the damping head 20, that is, the clearance area 43 between damping head surface 39 and the internal surface 44 of the cylinder. It will be noted that in operation, control orifices 42 must flow a volume of oil equal to the displaced volume of piston rod 19 for no stiffening effect to occur, this flow being driven by damping pressure existing in subchamber 37. If these apertures are sized such that they will flow less than the displaced volume of piston rod 19, then a stiffening effect will occur, due to compression of the fluid contained in subchambers 35 and 37 when a compressible liquid is used, or by flexing member 30 when an incompressible liquid is used.

At this point it is to be noted that in the design of the seismic isolation device 14, the damping and stiffening forces are determined by a seismic analysis, taking into account both the design of the structure and the particular locality in which the structure is located. A seismic transient due to an earthquake usually has a primary frequency of between about 3 and 5 cycles per second depending on the soil conditions. In this respect, if the soil has a damping effect, the frequency will be lower, and if it has less of a damping effect, the frequency will be higher. However, in areas which have rock subsoil characteristics, the frequency may be much higher than 5 cycles per second, and, in fact on granite the frequency could be as much as 30 cycles per second. The soil conditions for any locality are known, and this factors into the design of structures and also into the design of the seismic shock isolator 14. In this respect, structures are constructed not to have a primary resonant frequency at the seismic frequencies which are expected in a particular area, and the shock isolators are engineered to reduce the large deflections which are to be encountered as a result of the seismic input, as well as to provide a stiffening effect to suppress the response of higher frequency modes, such as found in the upper stories of a tall building. The design of the isolator is dependent upon the vibration modes inherent in the structure to which the isolator is to be applied, and a shock response spectra reflecting expected seismic events in the locality in which the structure is to be located. This shock response spectra, plotting spectral acceleration versus frequency is used as an input to a mathematical model of the building. Today, this mathematical model usually is computer generated from the architect's and engineer's plan drawings of the structure. When the model is excited by the input shock spectra, an output spectra reflecting how the structure is affected by the seismic event is obtained. When damping alone is added to a structure, the overall stresses and deflections within the structure are reduced, due to an overall decrease in the structure's shock response.

Figure 4:
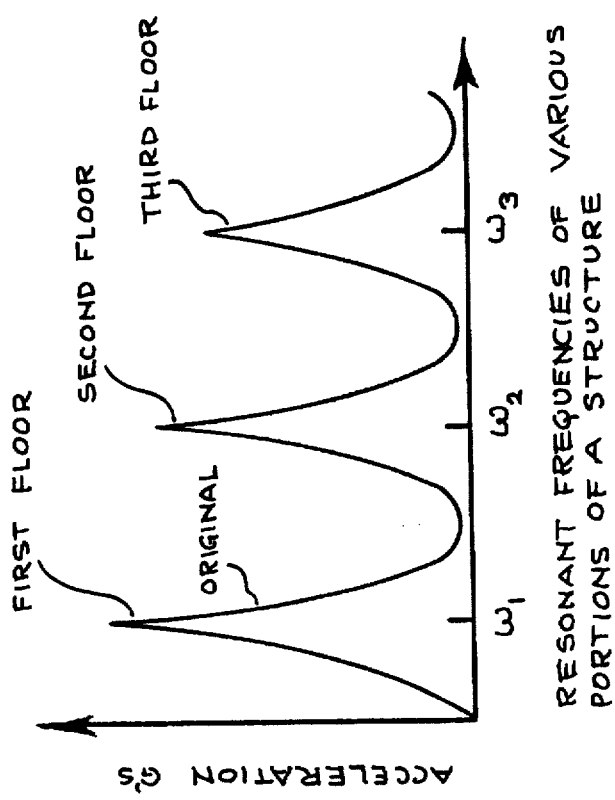
FIG. 4 is a graph showing the acceleration in Gs of various floors of a building at their resonant frequencies.

FIG. 4 depicts the response of a building without isolator 14 subjected to a seismic event. This particular structure has three floors, and the shock response from each floor has a spectral peak associated with the floor's natural frequency. The seismic event excites all three floors, but because the first floor loading includes the weight of the two floors above it, it has the lowest resonant frequency, with similar higher frequency responses noted for the two higher floors. Because the first floor is located closest to the source of the seismic input, it typically has the highest spectral acceleration.

Figure 5:
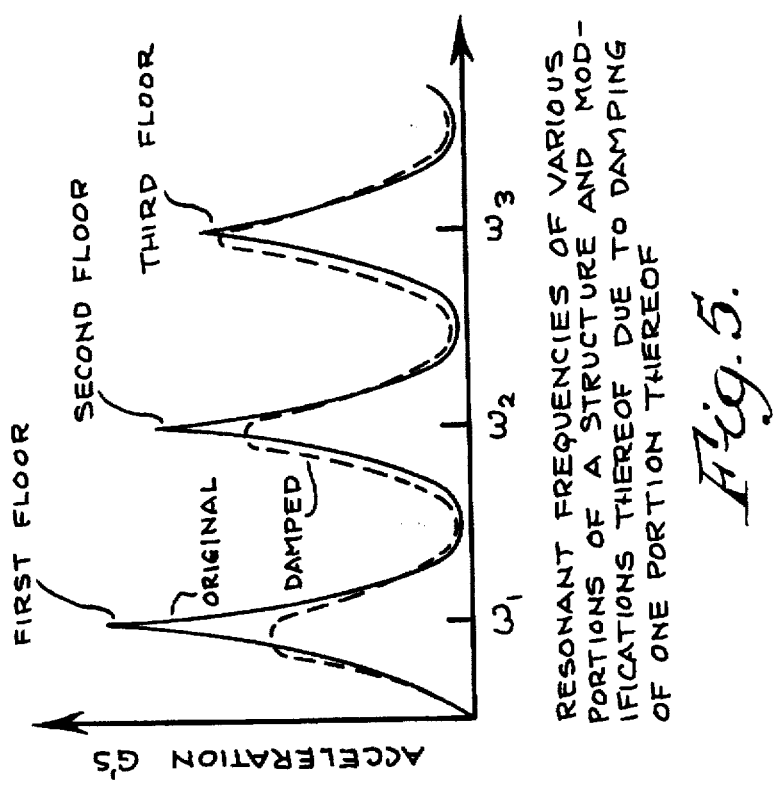
FIG. 5 is a graph of acceleration in Gs of the same building if damping only is applied to the first floor of the three-story building of FIG. 1.

FIG. 5 depicts the same structure, with damping added from several isolators 14 added to the first floor only. The addition of damping greatly reduces the first floor accelerations, and the response of the higher floors is also reduced somewhat because these floors are excited by the reduced damped first floor response.

In the embodiment shown in FIG. 2, the liquid 33 in the cylinder 15 is preferably from the family of silicone oils which are relatively high in compressibility as compared to petrochemical hydraulic fluids. The silicone oils will provide damping and will inherently provide spring-like stiffening. The petrochemical hydraulic fluids can also be used and they will provide only damping, but the structure of the isolator can be modified to add a spring-like component, as discussed in detail hereafter. A silicone oil fluid normally has a low bulk modulus to provide compressibility of 9%–11% by volume at a pressure of 20,000 psi. When a silicone oil is used, column or shaft 30 can be relatively rigid because the spring effect which accompanies stiffening, as described hereafter, is obtained from the compressibility of the silicone oil. However, when a petro-chemical product is used which has low compressibility, shaft or column 30 may have a yielding flexibility so that it provides a spring component to the stiffening action of the shock isolator 14. Thus, it can be seen that utilization of a silicone oil reduces the need for flexibility in the shaft or column 30, but it will be appreciated that either a silicone oil or a relatively incompressible petrochemical hydraulic fluid can be used, and both can be used to provide a spring-like stiffening action.

In operation, when there is relatively slow movement of piston 19 into and out of cylinder 15 there will be a damping action as fluid is moved around damping head 20 between subchambers 35 and 37. As piston 19 enters chamber 34, valve 38 will be in the position of FIG. 2B, and a certain amount of fluid equal to the displaced volume of piston 19 will pass through apertures 42 of valve 38 and ducts 45 in wall 29 into foam accumulator 32. As piston 19 enters chamber 34, the control valve 38 will close as soon as motion of damping head 20 occurs due to the inertia of the fluid column between the damping head 20 and the control valve 38 thus forcing the major part of the fluid to be swept across the damping head 20. At the same time the intrusion of the piston 19 into cylinder 15 reduces the total volume available for the fluid in the chamber 34 between the end cap 21 and the accumulator wall 29. Therefore, a small volume of hydraulic fluid 33 which is equal to that of the additional displacement of piston 19 into cylinder 15 is thus swept through the apertures 42 in the control valve 38 and deposited into the accumulator 32. The intrusion of fluid into accumulator 32 reduces the volume of the foam therein, slightly elevating the pressure in the accumulator chamber. When the piston 19 moves out of chamber 34, the damping head sweeps oil from subchamber 35 to subchamber 37, producing a damping action during extension of the isolator. In addition, as the piston 19 leaves chamber 34, the volume for fluid therein increases, creating a reduced pressure which is accommodated by the expansion of the pressurized volume of fluid (if compressible) and the expansion of foam in the accumulator which pushes open the control valve 38 to the position of FIG. 2A allowing the fluid or silicone oil to readily flow through the large orifices 45 in accumulator wall 29 into subchamber 37. Large orifices, such as 45, are required due to the relatively small pressure exerted by the expanding foam and the reduced pressure in chamber 34.

As noted above, as long as the isolator 14 is stroked relatively slowly, its output is essentially limited to that of a hydraulic damper. In this respect, the flow across the damping head 20 is metered in accordance with the above equation having a lower damping exponent than that of the control orifices 42 of valve 40. As the stroking velocity of the damper increases, driven by the frequency and amplitude of the seismic input applied thereto, through the building there is a process of simultaneous flows across the damping head 20 and through control orifices 42 when the isolator is compressed. Thus, the stroking velocity which is imparted to the damper through the building is dependent on the frequency and amplitude of the seismic input to the latter. The pressures resultant from the velocity of oil through the orifices 39 and 42 follow the respective flow equations associated with these orifices. For example, if the stroking speed of the piston is increased from one inch per second to 50 inches per second, there is an increase of fluid flow velocity by a factor of 50. Assume also that the damping head 20 has an effective orifice with a flow equation of $F=CV^K$ wherein K is 0.7 and that the aperture orifices 42 in the control valve follow the Bernoulli equation wherein K is 2.0. The compressive flow in the damper causes fluid flow across the damping head to increase by essentially a factor of 50 because of the increase of the velocity of the piston from one inch per second to 50 inches per second. The pressure differential across the damping head will follow the $V^{.7}$ relationship and will increase by a factor of $50^{.7}/1^{.7} = 15.4$. At the same time, the piston volume is entering the unit at a speed increased by a factor 50, and this volume is displaced across the control valve apertures 42 with an increased pressure which follows the equation for those apertures. The pressure differential across the control valve 38 follows the $V^2$ relationship and will increase by a factor of $50^2/1^2 = 2500$.

Going back to the original case where the piston was slowly stroking, assume that piston speed is increased to the point where the pressure across aperture 42 begins to exceed the pressure across the damping head. When this pressure becomes higher than the pressure across the damping head, it transmits as a high speed pressure wave at high velocity across the damping head, thereby simultaneously pressurizing the oil columns in subchambers 35 and 37. Thus, if there is, for example, 150 psi differential across the damping head 20 because of the different areas on its opposite faces, and 3,000 psi differential across the control valve 38, the quasi-steady state pressure that will exist in subchamber 35 is 3,000 psi and there will be 3,150 psi in subchamber 37 between damping head 20 and wall 29. Therefore, since the pressure differential across the damping head 20 is still 150 psi, the damping response remains unchanged. There is, however, a quasi-static pressure of 3,000 psi within cylinder 15 which will apply an unbalanced pressure of 3,000 psi over the cross sectional area of the piston 19, considering that the difference in area between face 47 of the damping head 20 and face 49 of the damping head 20 is the cross sectional area of the piston 19. There will always be an unbalanced pressure of 3,000 psi on the face 50' of dividing wall 29. Since the silicone fluid is compressible, the 3,000 psi pressure will cause the fluid to compress, providing a spring response superimposed over and thus additive to the damping output obtained by flow across damping head 20. In addition, any elastic flexure of the column or shaft 30 under the 3,000 psi load will yield an additional spring response. The combination of forces due to damping forces and spring forces is shown in FIG. 3.

Thus, as can be seen from FIG. 3, at lower velocities the damping output shown by the solid line provides most of the force, and as the velocity of the piston increases, the spring output of the isolator 14 increases, as shown by the dotted line, until the spring output exceeds the damping output. Furthermore, as noted above, the damping force tends to level off due to its low flow exponent. Thus, the total output from the device at any point consists of a damping force and a spring force, both of which are driven by the velocity of the piston, with the spring force being driven by velocity and absolute deflection of the shaft or column 30 when an incompressible liquid is used or by the compression of the compressible liquid when the latter is used. The velocity of the piston results from the relative movement between the parts of the structure to which shock isolator 14 is attached and, as noted above, the velocity of the piston is dependent on the frequency and amplitude of the seismic event which is applied to the structure. The resultant output from the isolator in compression is essentially visco-elastic, with the ability to control both damping (energy dissipation) and spring rate (elasticity) by proper selection of the relative areas of the effective damping head clearance 43 (which is effectively an orifice), the shape and size of the control valve orifice 42, the damping head diameter, the piston diameter, the cross sectional area of the column 30, and the type of fluid which is being used. In this respect, if the fluid is a silicone oil which is compressible, it provides a certain amount of spring force, and if the fluid is an incompressible hydraulic fluid, the spring force is applied by the deflection of column 30. Note that this stiffening force occurs only when the isolator is compressing. When piston 19 is extending, the pressure in subchambers 35 and 37 rapidly decay, valve 42 opens to the position of FIG. 2B, and the isolator reverts to a damper.

Figures 6, 7:
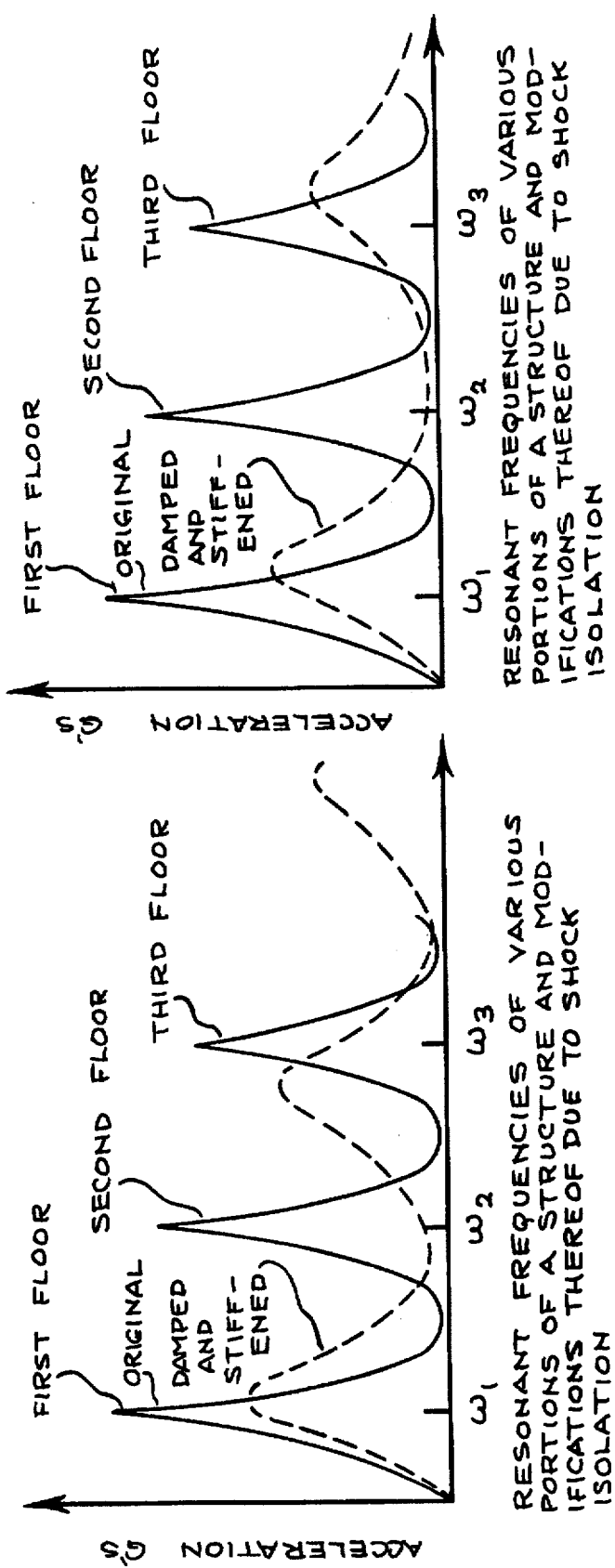
FIG. 6 is a graph showing the acceleration in Gs of the various parts of a building being reduced by the addition of the shock isolating device of the present invention when it applies both damping and stiffness thereto.
FIG. 7 is a graph of acceleration in Gs resulting from the addition to the building of the shock isolator of the present invention when it provides a combination of damping and velocity-driven elasticity.

The advantage of the seismic isolator 14, as described above, is readily apparent when it is added to a structure having a complex response, such as the multi-story building having the response of FIG. 6 which is subjected to a seismic input having a range of frequencies. As discussed previously, each floor of the building has its own distinct resonant mode or frequency, and a seismic input will excite these various floors or modes differently since the seismic input has a relatively wide frequency band. FIG. 4 shows the typical shock response spectra. Thus, the resonant frequency of floor 1 is $\omega_1$, the resonant frequency of floor 2 is $\omega_2$, and the resonant frequency of floor 3 is $\omega_3$. Thus, whenever the seismic input excites the building, there will be a spectral response acceleration of the building in Gs as described above, and such as shown on the graph of FIG. 4, with the spectral peaks at the primary response frequencies of each floor.

FIG. 5 shows that which occurs if there is the addition of damping alone to the building. This damping will reduce the structural loading caused by each of the resonant modes. In FIG. 5, if damping from several isolators 14 is added to the first floor only, a greatly reduced acceleration response will be realized for the first floor with a lessened improvement in the response of the higher floors which have higher resonant frequencies. There is the lessened response at the higher floors because these floors are excited by the reduced damped first floor response. The damping will also result in a slight shift in the frequency of the responses. Thus, the acceleration is reduced in all modes, with the first floor being the most substantially reduced.

As noted above, the use of the seismic shock isolators 14 in a structure provides both damping restraining forces and spring-like stiffening restraining forces, and the stiffening will suppress the responses in the higher resonant modes by shifting them to still higher frequencies, which are ideally outside the range of frequency excitations caused by the seismic event. FIGS. 6 and 7 show this response. In FIG. 6 the combination of damping and velocity-driven elasticity in the isolator 14 provides substantial improvement over damping alone. Proper design with high damping and stiffness allows suppression of the higher frequency modes. Thus, as can be seen from FIG. 6, the amplitude of the acceleration of the first floor has been reduced and the resonant frequency has been slightly increased by stiffening. The amplitude of acceleration of the second floor has also been greatly reduced and the frequency has been increased. The same is true for the resonant frequency of the third floor. As noted above, proper selection of stiffness and damping can shift higher modes outside of the frequency range of the seismic event. In FIG. 7 another even more improved response is shown over FIG. 6, with the response of the third floor shifted entirely out of the range of excitation of the seismic event.

The foregoing description has referred to two types of seismic isolators, namely, one having a compressible fluid therein and one having an incompressible fluid therein. The one with a compressible fluid provides a spring-like stiffening action due to the compressibility of the compressible fluid as described above. The one with an incompressible fluid provides a spring-like stiffening action due to the yielding of the column which supports the dividing wall between the damping chamber and the accumulator. In this respect, the column, such as 30 in FIG. 2, can be fabricated of a material which will yield axially within its elastic limit to provide the desired spring-like force, without permanent deformation.

In FIGS. 8 and 9 an embodiment is shown of a seismic isolator 50 of the second type mentioned above, namely, one which utilizes an incompressible fluid, such as a petrochemical oil, to provide the combination of damping and spring-like action. In addition, isolator 50 is of the type which will provide a response which varies with changing seismic conditions sensed by various input devices. Seismic isolator 50 includes a cylinder 51 having an end wall 52 which supports piston 53 in sealed engagement. A damping head 54 is mounted on the end of piston 53 and in this embodiment there is a predetermined clearance between the outer surface 56 of the damping head and the inner surface 58 of cylinder 51. Four equally spaced spacer discs 55 are mounted on damping head 54 to maintain its outer surface 56 in uniformly spaced relationship to cylinder surface 58. This arrangement is fully disclosed in U.S. Pat. No. 4,867, 286. Normally, the major portion of the fluid 60 which occupies subchambers 57 and 59 passes between them through conduits 61 and 62 having a suitable control orifice structure 63 therebetween which includes a housing 64 containing a valve 65 which is driven to a desired position by motor 67. When valve 65 is fully closed, the space 66 between surfaces 56 and 58 provides the maximum amount of damping, and lesser amounts are provided when valve 65 is opened, with the amount varying inversely with the amount of opening. As will be explained hereafter, motor 67 receives commands from suitable sensing devices and processors to vary the damping effect of piston 53 in response to seismic inputs.

Figure 2B:
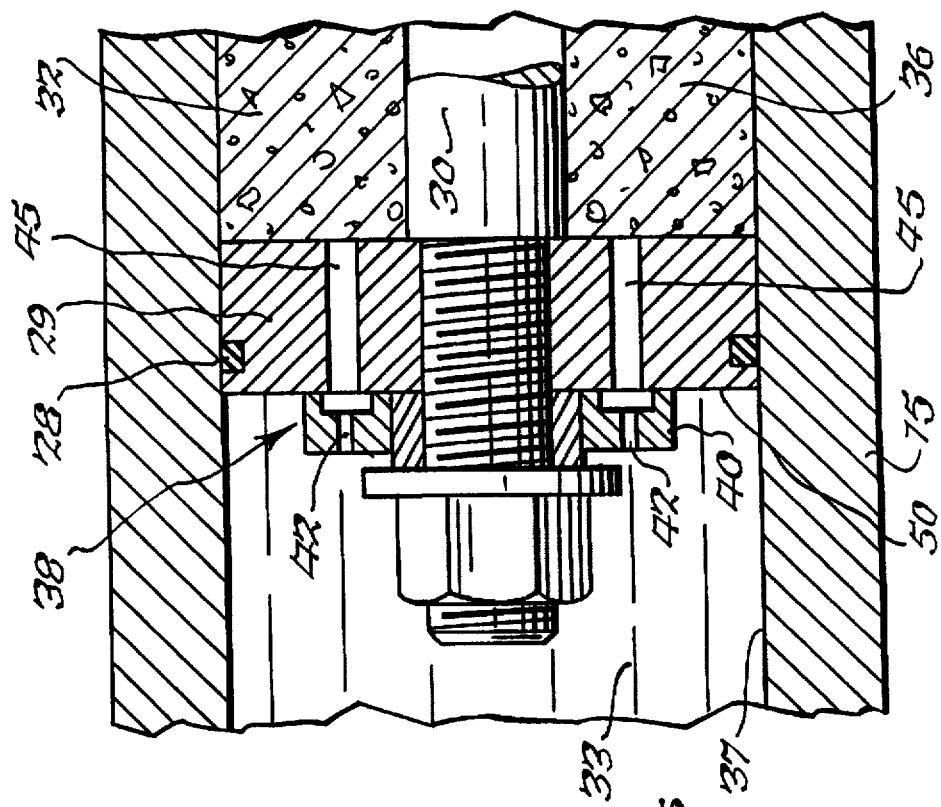
FIG. 2B is a fragmentary enlarged view showing the position of the control valve when the piston of the isolator of FIG. 2 is traveling to the right in FIG. 2.
Figure 2A:
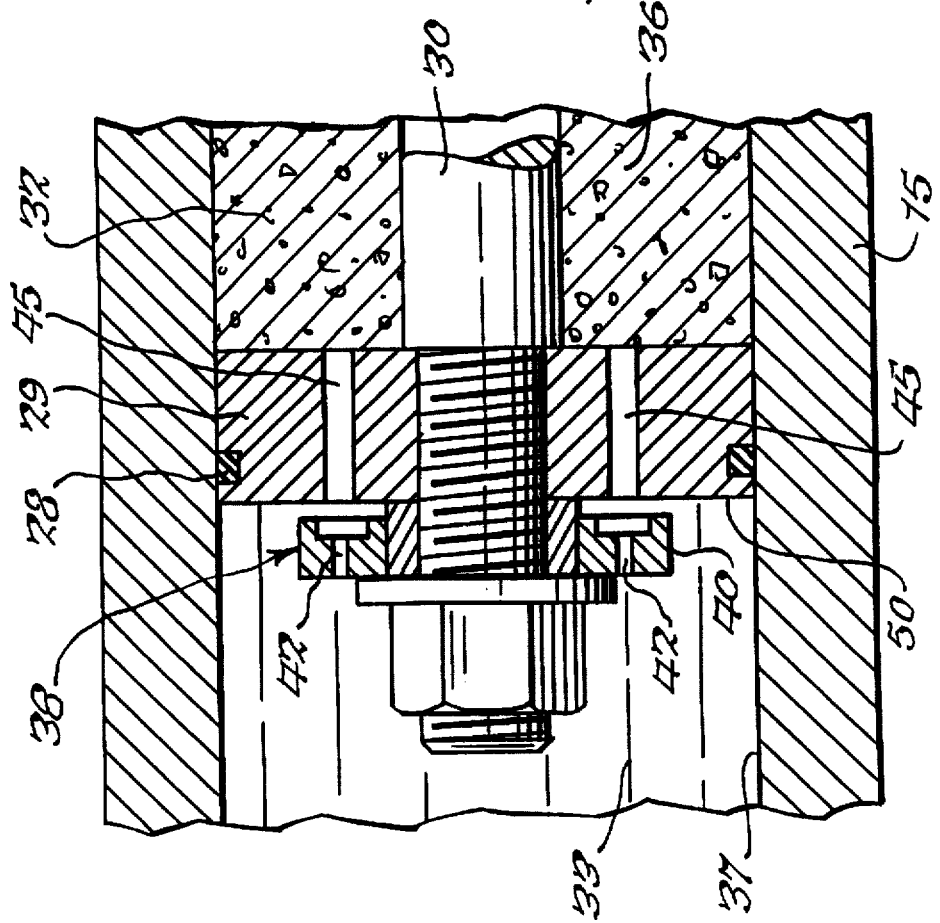
FIG. 2A is a fragmentary enlarged view showing the position of the control valve when the piston of the isolator of FIG. 2 is traveling to the left in FIG. 2.

Cylinder 51 also includes an accumulator chamber 69. A movable wall 70 separates subchamber 59 from accumulator chamber 69. Wall 70 includes an O-ring 71 to provide a tight seal between subchamber 59 and accumulator chamber 69. A valve structure 72 is associated with dividing wall 70. The valve structure 72 includes a valve disc 72' which is open in the position shown to permit fluid to pass from accumulator chamber 69 through ducts 73 in wall 70 to subchamber 59 when piston 53 is traveling to the left in FIG. 8. Valve 72' is slidable on cylindrical member 74 between a closed position (such as shown in FIG. 2B) wherein it abuts face 75 of wall 70 and an open position (such as shown in FIG. 2A) wherein it abuts washer 76 which is held in position by nut 77 on shaft 79. Wall 70 is supported at one end of flexible column 80, the other end of which is rigidly affixed in member 81. The flexibility of column 80 is achieved because portions 82 and 83 thereof are connected by flexible resilient integral strips 84 (FIG. 8A).

When piston 53 is moving into cylinder 51, and when valve 72 is closed, a damping action will be provided as fluid travels between subchamber 57 and subchamber 59 through space 66 at the outside of damping head 54 and through conduits 61 and 62 and valve 63. As noted above, there is primarily a damping action when the piston 53 is moving slowly, and there is a small amount of spring-like action due to passage of liquid from subchamber 59 into accumulator chamber 69, as explained above relative to FIG. 3. The spring-like action will increase with the speed of the piston 53, as further explained above relative to FIG. 3. When piston 53 is passing into cylinder 51, the liquid will pass into accumulator chamber through bore 86 which extends through shaft 79 and wall 70 and past needle valve 85 and through radial slots 87 in column 82. Furthermore, strips 84 will flex within their elastic limit to provide a spring action.

The resilience of column 80 can be varied by axially moving annular shoe 89 against strips 84 on column 80. In this respect, annular shoe 89 is threadably engaged with column 80 at 90. An annular gear surface 91 on annular shoe 89 is driven by pinion 92 which in turn is driven by motor 93. Thus, as shoe 89 moves to the left, it will straighten strips 84 to cause column 80 to be more stiff, and when motor 93 drives shoe 89 to the right, column 80 will be less stiff. When it is more stiff, it will provide a larger spring force than when it is less stiff.

Needle valve 85 is located at the end of stem 94 which is driven by motor 95. Stem 94 is threadably engaged with column 80 at 96. A slip joint 97 is located between motor driven shaft 99 and shaft 94. Motor 95 can thus drive needle valve 85 back and forth relative to bore 85 to thus control the aperture size in accumulator wall 70. The varying of the aperture size varies the control aperture.

The end of piston 53 has a connecting member 100 thereon which pivotally mounts piston 53 to a suitable portion of a building, and a pivotal connection 101 is suitably affixed to the right end of cylinder 51 for attaching it to another portion of the building.

A schematic diagram for operating the seismic isolator 50 of FIG. 8 is disclosed in FIG. 9. This diagram only shows a few isolators 50, but it will be appreciated that numerous additional isolators are required. Basically, the circuit shown utilizes a sensor 102 for sensing the ground motion and accelerometers 103 for sensing the movement of building 104. Sensors 102 may be of the electrical resistance or magnetic inductance type, and accelerometers 103 may be of the quartz crystal piezoelectric type or inertial mass type. The sensed values of ground motion and movement of the building are inputed by cables 106 into microprocessor 105 which in turn is coupled by cables 108 to a control unit energizer 107 which in turn energizes motors 67, 93 and 95 through cables 109 for the purpose of providing the proper damping action for piston 53, the proper stiffening to column 80, and the proper aperture opening at needle valve 85 to achieve the above desired dampening and stiffening which will provide a stabilization of the type depicted in FIG. 7 and as explained above relative to FIGS. 1–7. While the cables 106, 108 and 109 are shown as single lines, it will De appreciated that they may contain numerous conductors, as required.

While the seismic isolator 50 of FIG. 8 has disclosed an aperture of wall 70 which is variable and a column 8 which can have its stiffness varied, it will be appreciated that seismic isolators can be provided which have a fixed orifice and a variable stiffness column. Furthermore, the seismic isolator 50 of FIG. 8 can be modified to utilize compressible liquid, in which event a column which supports the accumulator wall can be made rigid and only the control orifice can be varied in a manner disclosed above by the use of a motor driven needle valve 85 or any other suitable structure. Additionally, it will be appreciated that the seismic isolator of FIG. 8 can use compressible liquid, in which event even more elasticity is obtained than with the use of the incompressible liquid described above.

Additionally, it will be appreciated that manual controls can be substituted for the various motor-driven portions of the isolator 50 of FIG. 8 to thus provide an isolator which can be adjusted to specific parameters in the field to meet specific anticipated conditions. Thus, the control orifice associated with the accumulator wall and the damping orifice associated with the damping head and the flexibility of the column in the accumulator chamber can each be individually adjusted by suitable manual connections such as knobs connected to the various shafts shown in FIG. 8. This manually adjustable type of isolator does not operate with a control system such as shown in FIG. 9.

In FIGS. 10-12 the above described seismic shock isolators 14 are shown associated with a building 115 which is supported on a plurality of base isolating bearing structures 117 at its four corners by columns 119 which are essentially extensions of building columns 120. The faces 121 of the base isolation bearings 117 are dished and the lower ends 122 of the columns 119 are curved so that each of column 119 can move relative to each base isolation bearing 117 which is immovably embedded in the ground 123.

The first end of each seismic isolator 14 is connected to an associated column 119 by a ball joint 124, and the opposite end is connected by means of a ball joint 127 (FIG. 11) to the top 125 of an immovable foundation which is firmly anchored in the ground 123. Thus, the opposite ends of each isolator 14 have a ball joint connection with the part to which it is attached. The foundation 125 can be of any suitable construction, such as concrete members embedded in the earth 123 or they can be suitable structural members, such as I-beams or the like, which are driven into the ground to the required depth.

In operation, whenever a seismic event occurs, the shock isolators 14 of FIGS. 10-12 will suppress the shock which would otherwise be applied to building 115. In this respect, the earth 123 will move during the seismic event. However, the building 115 which is connected to the earth through seismic shock isolators 14 will be insulated to a certain degree from the earth by the seismic shock isolators 14 which will suppress the shock by a combination of damping and spring-like stiffening in the manner described above where the mode of operation of shock isolators 14 was described.

It is to be noted that in the configuration shown, eight seismic isolators 14 are utilized, with two isolators at each corner of the building. In addition, the isolators are positioned so that at adjacent corners there are isolators in opposition to each other. For example, the two isolators 14 which are also designated by the numeral A are in a straight line and positioned in opposition to each other so that when the earth 123 moves in the direction of the longitudinal axes of the isolators 14 which are designated A, one of the isolators 14, which is designated A, will produce a combination of damping and spring-stiffening, as described above, whereas the other seismic isolator 14, which is in opposition thereto and designated A, will produce only damping. In this regard, in one of the seismic isolators 14, which is designated A, the piston will be moving into the isolator whereas in the opposed seismic isolator 14 which designated A the piston will be moving out of the housing. The same action occurs in all pairs of opposed isolators 14. Thus, during a seismic event, when the earth 123 moves, the movement of the building 120 will be suppressed when the earth moves relative thereto because columns 119 are mounted on base isolation bearings 117, and the building is restrained against excessive movement by the shock isolation devices 14. It wil be appreciated that the configuration of isolators 14 in FIG. 10 is merely by way of example, and other configurations can be used.

Summarizing the foregoing, the improved seismic isolators 14 and 50, when installed in a structure, reduce building stresses due to the addition of damping restraining forces, and tend to cause various portions thereof to have their resonant frequencies increased with increases in frequencies of the seismic event and thus provide stiffening restraining forces to stiffen the structure in addition to damping it so that the ultimate result is a shifting to increased values of the resonance of various portions of the structure accompanied by a reduction in the peak forces which are applied thereto. The damping restraining forces and the stiffening restraining forces having a spring component are dependent on the velocity and frequency imparted to a structure by the seismic event and thus these forces are dependent on the velocities associated with the frequencies. Ideally the increase in at least some of the resonant frequencies of the structure will cause them to be above the frequency band of the seismic event. The improved isolators 14 and 50 of the present invention provide both damping and added stiffness to a structure subjected to a seismic event. The damping dissipates energy from the structure, thus reducing motion and stress. The added stiffness reduces stresses further by suppressing the response of higher frequency modes by increasing their dynamic response frequency so that they are excited by a reduced acceleration region of the input spectra. Under normal non-seismic conditions, the isolators are passive and impart no force and hence no additional stress to the building.

While preferred embodiments of the present invention have been disclosed, it will be appreciated that it is not limited thereto but may be otherwise embodied within the scope of the following claims.

What is claimed is:

1. A method of protecting a structure against damage due to the frequency and amplitude of seismic forces which produce velocities and frequencies in said structure comprising the steps of learning the required dampening restraining forces and stiffening restraining forces of a structure by seismic analysis including determining the resonant frequencies of said structure, applying a combination of damping restraining forces and velocity and frequency dependent stiffening restraining forces having a spring component to said structure both of which are dependent on the velocities associated with the frequencies imparted to said structure by said frequency and amplitude of said seismic forces wherein said damping restraining forces are dominant to said stiffening restraining forces having said spring component when said velocities associated with said frequencies imparted to said structure by said seismic forces are sufficiently below said resonant frequencies of said structure to thereby permit flexing of said structure accompanied by some stiffening thereof, and applying increased stiffening restraining forces with said spring component as said velocities associated with said frequencies imparted to said structure by said seismic forces increase to thereby further stiffen said structure by effectively increasing the resonant frequencies thereof.

2. A method as set forth in claim 1 wherein said combination of damping restraining forces and velocity and frequency dependent stiffening restraining forces having a spring component are provided within said structure and to various portions of said structure.

3. A method of protecting a structure against damage due to the frequency and amplitude of seismic forces which are applied to said structure and produce frequencies and velocities in said structure comprising the steps of learning the required dampening restraining forces and stiffening restraining forces of a structure by seismic analysis including determining the resonant frequencies of said structure, and applying velocity and frequency dependent stiffening forces having a spring component to said structure which are dependent on said frequencies and velocities produced in said structure by said frequency and amplitude of said seismic forces, and increasing said stiffening forces with said spring component whenever the velocities associated with the frequencies produced in said structure by said seismic forces cause said structure to approach its resonant frequencies to thereby essentially increase the resonant frequencies of said structure and decrease the accelerations thereof and thus lessen the tendency of said structure to resonate in response to said seismic forces.

4. A method as set forth in claim 3 wherein said velocity and frequency dependent stiffening forces having a spring component are applied within said structure.

5. A method of protecting a structure against damage due to the amplitude and frequency of seismic forces which are applied to said structure and produce frequencies and velocities in said structure comprising the steps of learning the required dampening restraining forces and stiffening restraining forces of a structure by seismic analysis including determining the resonant frequencies of said structure, applying a combination of damping forces and velocity and frequency dependent stiffening forces having a spring component to said structure both of which are dependent on the velocities associated with the frequencies imparted to said structure by said amplitude and frequency of said seismic event, and applying increased stiffening forces to said structure as the velocities associated with the frequencies imparted to said structure increase in response to said seismic forces causing the structure to approach its resonant frequencies to thereby decrease the effective amplitude of the response of the structure to said seismic forces and also effectively increase the resonant frequencies of said structure and lessen the tendency of the structure to resonate in response to said seismic forces.

6. A method as set forth in claim 5 wherein said combination of damping forces and velocity and frequency dependent stiffening forces having a spring component are applied within said structure to various portions of said structure.

7. A method of protecting a structure against damage due to the amplitude and frequency of seismic forces which produce velocities and frequencies in said structure comprising learning the required dampening restraining forces and stiffening restraining forces of a structure by seismic analysis including determining the resonant frequencies of said structure, placing passive hydraulic restraining members on said structure, and causing said passive hydraulic restraining members to apply a combination of hydraulic damping and velocity and frequency dependent stiffening with a spring component to said structure both of which are dependent on the velocities associated with the frequencies produced in said structure by said seismic forces.

8. A method as set forth in claim 7 wherein said passive hydraulic restraining members are placed within said structure.

9. A method of protecting a structure against damage due to the amplitude and frequency of seismic forces which produce velocities and frequencies in said structure comprising the steps of learning the required dampening restraining forces and stiffening restraining forces of a structure by seismic analysis including determining the resonant frequencies of the structure, applying a combination of damping forces and velocity and frequency dependent stiffening forces with a spring component to said structure which are dependent on the velocities associated with the frequencies produced in said structure by said seismic forces, and applying increased stiffening forces with a spring component to said structure as said seismic forces cause said velocities associated with the frequencies in said structure to increase.

* * * * *